(12) United States Patent
Madonia

(10) Patent No.: US 7,478,492 B2
(45) Date of Patent: Jan. 20, 2009

(54) INTEGRATED FLAT PANEL DISPLAY FOR MOUNTING TO EXTERIOR SURFACES OF MOTOR VEHICLES

(76) Inventor: Joseph R. Madonia, 6965 W. Williams Dr., Glendale, AZ (US) 85310

( * ) Notice: Subject to any disclaimer, the term of this patent is extended or adjusted under 35 U.S.C. 154(b) by 717 days.

(21) Appl. No.: 10/845,713

(22) Filed: May 14, 2004

(65) Prior Publication Data

US 2005/0253699 A1 Nov. 17, 2005

(51) Int. Cl.
G09F 21/04 (2006.01)
G06F 3/038 (2006.01)
(52) U.S. Cl. .......................................... 40/591; 345/204
(58) Field of Classification Search ................ 340/463, 340/425.5; 40/590, 591, 593
See application file for complete search history.

(56) References Cited

U.S. PATENT DOCUMENTS

| | | | |
|---|---|---|---|
| 4,611,193 A | 9/1986 | Bruggemann | |
| 4,638,287 A | 1/1987 | Umebayashi et al. | |
| 4,716,458 A | 12/1987 | Heitzman et al. | |
| 4,787,040 A | 11/1988 | Ames et al. | |
| 5,576,687 A | 11/1996 | Blank et al. | |
| 5,708,410 A | 1/1998 | Blank et al. | |
| 5,709,446 A | 1/1998 | Kubota et al. | |
| 6,008,732 A | 12/1999 | Lam | |
| 6,140,934 A | 10/2000 | Lam | |
| 6,281,804 B1 | 8/2001 | Haller et al. | |
| 6,289,332 B2 | 9/2001 | Menig et al. | |
| 6,346,877 B1 | 2/2002 | Flick | |
| 6,443,573 B2 | 9/2002 | Aoki | |
| 6,448,893 B1 | 9/2002 | Dobberkau et al. | |
| 6,532,113 B2 | 3/2003 | Aoki et al. | |
| 6,539,289 B2 | 3/2003 | Ogino et al. | |
| 6,646,864 B2 | 11/2003 | Richardson | |
| 6,663,250 B1 | 12/2003 | Rada et al. | |
| 6,667,726 B1 | 12/2003 | Damiani et al. | |
| 6,812,851 B1* | 11/2004 | Dukach et al. | ............ 340/815.4 |
| 6,919,865 B2* | 7/2005 | Tamaru | ...................... 345/2.1 |
| 7,230,823 B2* | 6/2007 | Richardson et al. | ......... 361/683 |
| 2002/0022979 A1* | 2/2002 | Whipp et al. | ................... 705/5 |
| 2002/0045986 A1 | 4/2002 | Tamaru | |

(Continued)

OTHER PUBLICATIONS

International Search Report and Written Opinion issued in related international application PCT/US05/10800 on Apr. 2, 2008.

*Primary Examiner*—Amr Awad
*Assistant Examiner*—Randal Willis
(74) *Attorney, Agent, or Firm*—Quarles & Brady LLP

(57) ABSTRACT

A flat panel display is integrated with and mounted to an exterior portion of a motor vehicle. The flat panel display, such as LED or plasma display, is mounted flush to an exterior portion of a vehicle body. A protective rim surrounds at least a portion of the perimeter the display. A protective layer is disposed on a viewing surface of the display. A control circuit is coupled for controlling the display. A memory device is coupled to the control circuit for storing images. An operator control panel is coupled to the control circuit for controlling operation of the display. A communication link is coupled to the control circuit for receiving images for display on the flat panel display. A sensor is coupled to the control circuit for sending a sensor signal to the control circuit and causing an image to be displayed on the flat panel display.

1 Claim, 4 Drawing Sheets

U.S. PATENT DOCUMENTS

2004/0090317 A1* 5/2004 Rothkop .................... 340/435
2005/0000126 A1* 1/2005 Gray et al. .................. 40/452
2005/0024190 A1* 2/2005 Edens et al. ............. 340/426.1

* cited by examiner

INTEGRATED FLAT PANEL DISPLAY FOR MOUNTING TO EXTERIOR SURFACES OF MOTOR VEHICLES

FIELD OF THE INVENTION

The present invention relates in general to flat panel displays and, more particularly, to an integrated flat panel display for mounting to exterior surfaces of motor vehicles.

BACKGROUND OF THE INVENTION

Viewable displays are well-known and can be implemented in many different technologies, e.g., cathode ray tubes (CRTs), liquid crystal displays (LCDs), and plasma displays. Displays present information from some electronic system in a format for viewing by human audiences. For example, displays are used for televisions, computer screens, airport monitors, and hand-held electronic devices such as pagers, cell phones, and personal organizers. Displays also find applications in the interior dashboard of automobiles to show road speed, engine revolutions per minute, fuel level, and engine monitoring and diagnostics. In more sophisticated applications, the dashboard display may present global positioning system (GPS) data in the form of maps, surrounding terrain, weather, and traveler's information and advisories.

Automobile owners and occupants often find the need or desire to put information on the exterior of the vehicles. The information is intended for those who need to know, or for those whom the occupants of the automobile would like to reach. For example, bumper stickers have been around for many years to make political statements, support favorite sport teams, demonstrate for or against causes, show allegiance to schools or organizations, tout child's academic performance, and generally to make a statement. License plate frames contain advertisements and statements about the occupants' hobbies, e.g., "I'd rather be golfing". Taxis have billboards attached to the trunk or roof. Busses have advertisements on the side panels. Commercial transport trucks have caution signs, such as "Hazardous material" or "Oversized Load". These type of fixed displays are pre-printed, affixed to a surface of the vehicle, and are not designed or intended to be readily changed or re-used. When the need or desire to make the statement has passed, then the message is removed and possibly replaced with another fixed message.

In another application, changeable vehicle displays can be found on buses and public transportation. A bus may have the next scheduled stop displayed on a front display, e.g., mounted interior against the windshield. The next-stop display is a separate stand-alone unit which is bolted to the roof of the bus. The bus displays are low-resolution, generally a light emitting diode (LED) matrix. At best, the bus display may contain a few letters indicating the next scheduled stop or present status, e.g., "Main St.", or "University", or "Out-of-Service". Although the display can be changed, it typically requires some input from the driver. The driver may punch up "Main St.", which will be displayed until the bus arrives at Main St. The driver then dials-in the next scheduled location with a push button or knob.

The difficulty in the fixed displays and selectable displays is the limited amount of information that is presented and the requirement to manually change the information content of the display. The driver must peal-off the bumper sticker, change out the sign or billboard, or press buttons to put up other information. Even displays that can be changed are low-resolution, convey very limited information, and the information remains fixed until it is manually changed.

SUMMARY OF THE INVENTION

In one embodiment, the present invention is a visual display integrated with and mounted to an exterior portion of a motor vehicle and comprising a flat panel display mounted flush to an exterior portion of a vehicle body. A control circuit is coupled for controlling the flat panel display. A memory device is coupled to the control circuit for storing images. An operator control panel is coupled to the control circuit for controlling operation of the flat panel display.

In another embodiment, the present invention is an integrated display on an exterior portion of a motor vehicle comprising a visual display mounted to an exterior portion of a vehicle body. A control circuit is coupled to the visual display for controlling images presented on the visual display.

In yet another embodiment, the present invention is a method of making an integrated display for mounting on an exterior portion of a motor vehicle comprising providing a display adapted for mounting to an exterior portion of a vehicle body, and providing a control circuit for coupling to the display and controlling images presented on the visual display.

DETAILED DESCRIPTION OF THE DRAWINGS

The present invention is described in one or more embodiments in the following description with reference to the figures, in which like numerals represent the same or similar elements. While the invention is described in terms of the best mode for achieving the invention's objectives, it will be appreciated by those skilled in the art that it is intended to cover alternatives, modifications, and equivalents as may be included within the spirit and scope of the invention as defined by the appended claims.

Figure 1:
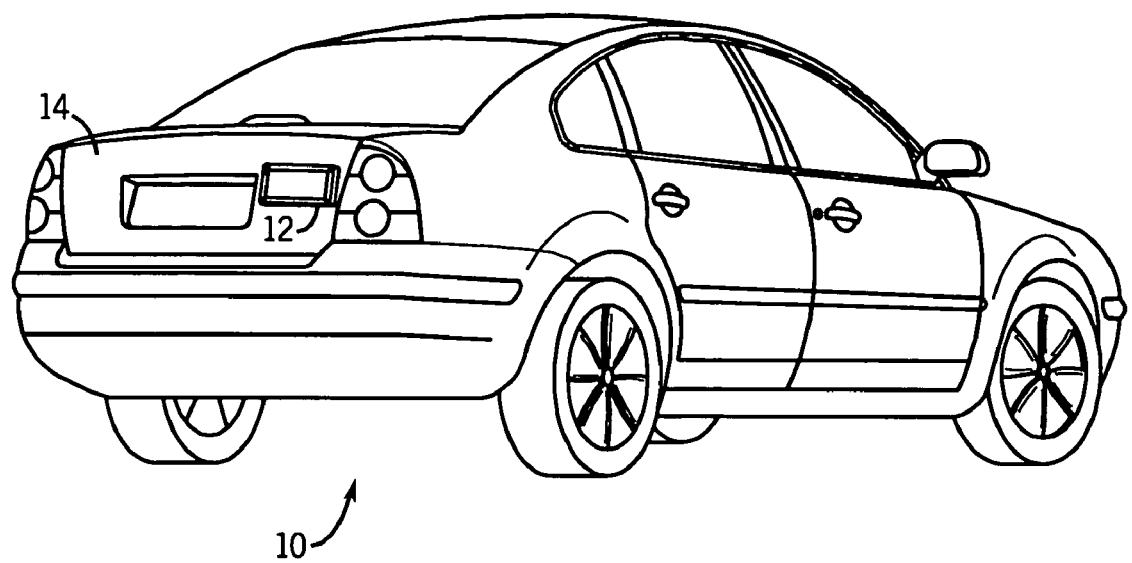
FIG. 1 is a perspective rear view of a motor vehicle with integrated display.
Figure 2A:
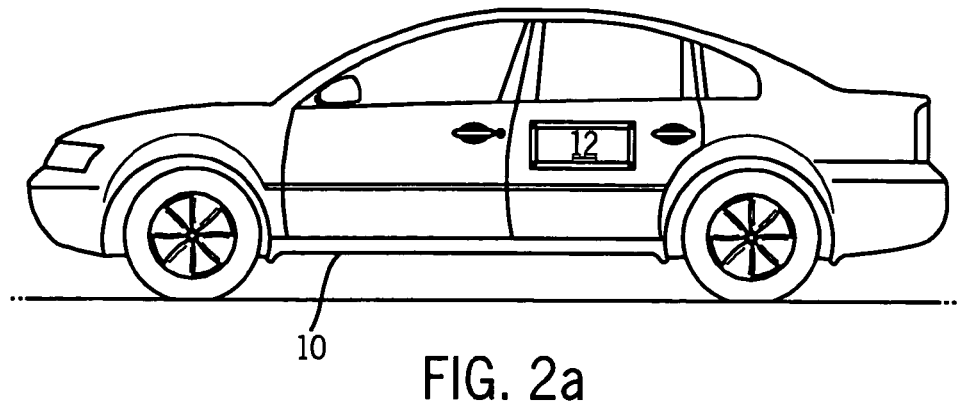
FIGS. 2a-2b illustrates side and front views of the motor vehicle with integrated display.
Figure 2B:
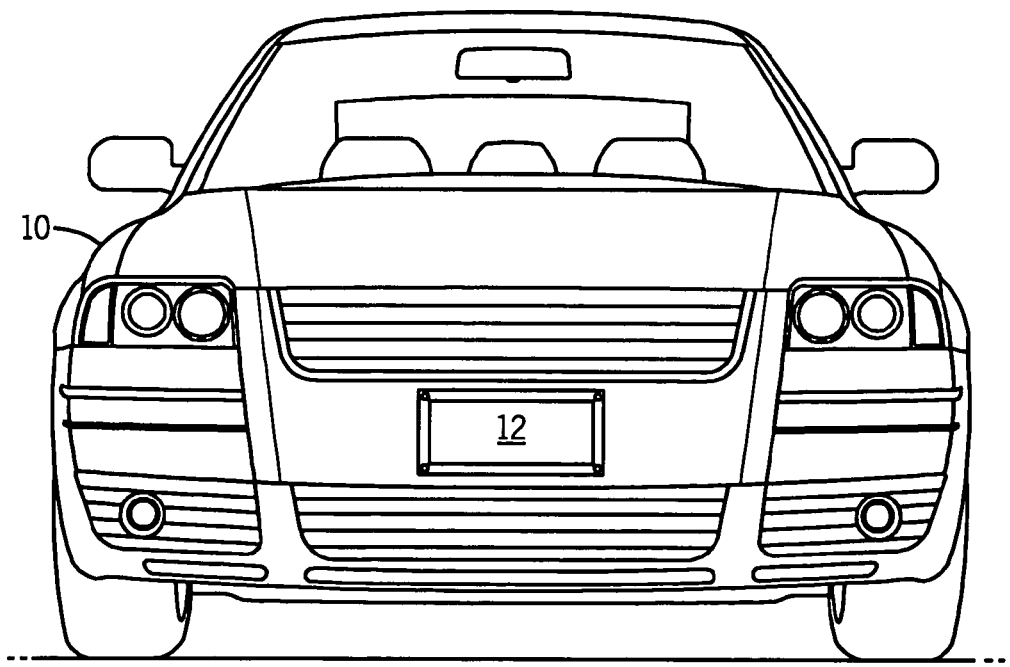

Referring to FIG. 1, motor vehicle 10 is shown for providing a mode of transportation for people, livestock, plants, and goods. While vehicle 10 is illustrated as an automobile, the inventive concepts described herein apply equally well to trucks, motorcycles, trains, light rail, subways, watercraft, aircraft, and any other movable medium of transportation. Vehicle 10 includes an external visual display 12, which is integrated within body or frame 14 of the vehicle. Display 12 is shown mounted to the rear or trunk area of vehicle 10. In other embodiments, display 12 can be mounted to the sides, front, top, or other solid body portion of vehicle 10. When mounted to the horizontal portion of the top or roof of vehicle 10, or to the horizontal portion of the trunk, display 12 may be supported by a framework or bracing to hold the display in a vertical orientation for viewing by others external to the vehicle. FIG. 2a illustrates display 12 mounted to a side of vehicle 10, and FIG. 2b shows display 12 mounted to a front portion of vehicle 10. Display 12 may be factory installed or an after-market add-on.

Figure 3:
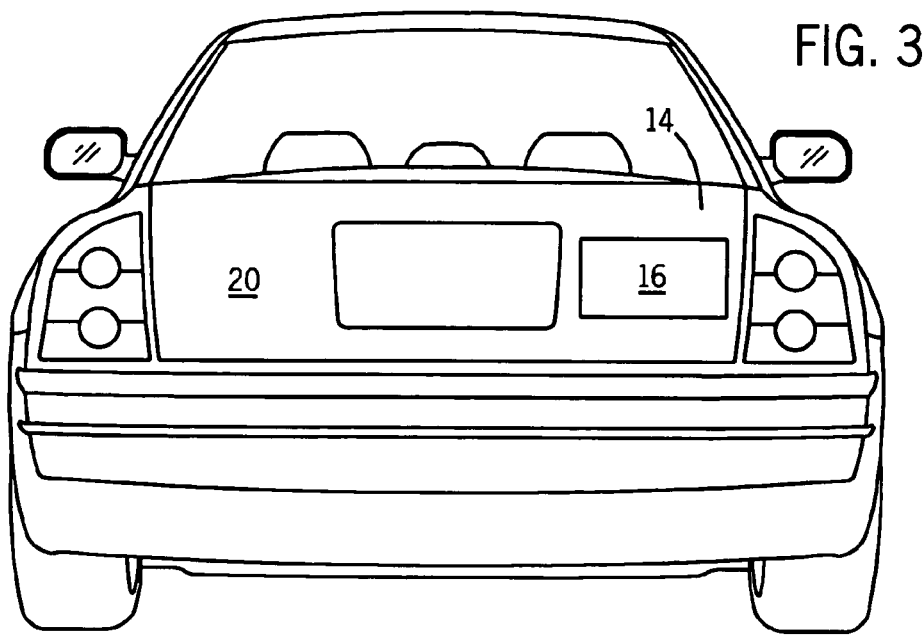
FIG. 3 illustrates a rear portion of the motor vehicle with cut-out.

In FIG. 3, a portion of body 14 is cut-out for installation of display 12. Cut-out 16 can be rectangular, oval, circular, or other geometric shape. Cut-out 16 may be wide and thin, tall and narrow, positioned high or low, or placed in any other convenient and useful location. Cut-out 16 may be formed around a portion of existing objects on body 14, such as license plates, trunk locks, tail lights, or body molding. In one embodiment, cut-out 16 is 9 inches high and 15 inches wide in a flat portion of trunk or rear area 20 of body 14. Display 12 has a similar shape as cut-out 16 in order to fit into the cut-out area.

Figure 4:
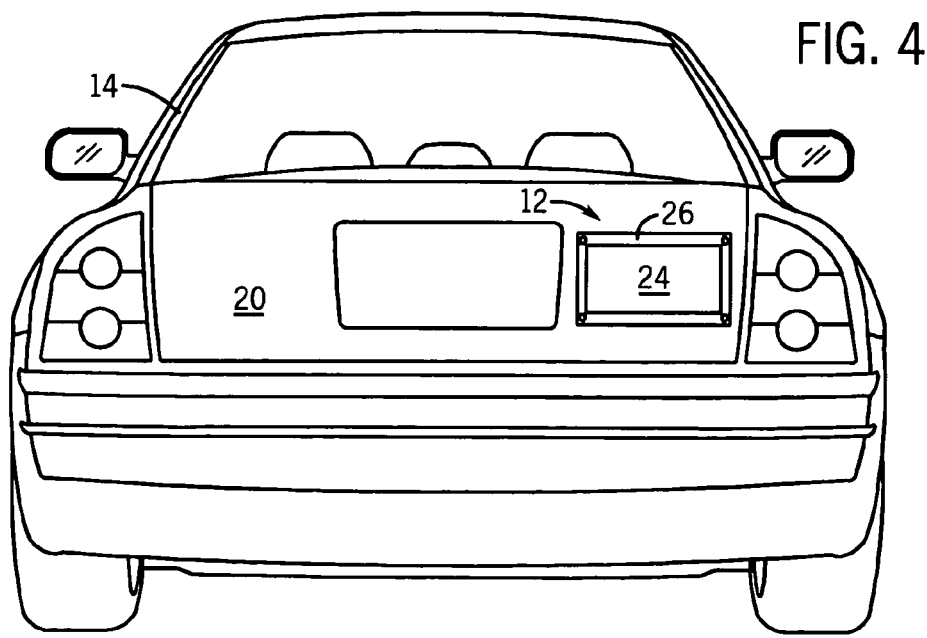
FIG. 4 illustrates the rear portion of the motor vehicle with integrated display installed in the cut-out.

In FIG. 4, display 12 is installed into cut-out 16. Display 12 is installed integral with and mounted flush to a surface of trunk 20 of body 14. A screen 24 of display 12 is substantially aligned with the surface of trunk area 20, or the screen may be slightly inset or offset from the surface of trunk 20. A protective rim 26 surrounds the perimeter of display 12 and extends slightly outward from the surface of trunk 20 and screen 24. Any large object, e.g., a shopping cart, which comes in contact with body 14, in and around display 12, will likely strike protective rim 26 and avoid directly contacting screen 24. Protective rim 26 is made from rubber, or resilient plastic or polymer.

Figure 5:
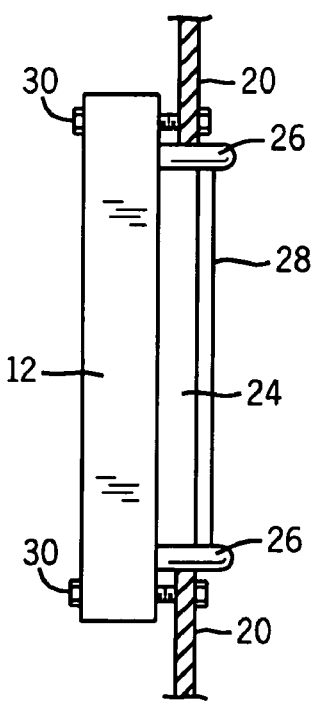
FIG. 5 illustrates a cross-sectional view of the vehicle body with integrated display.

A cross-sectional view of display 12 installed in trunk area 20 is shown in FIG. 5. A protective layer 28, such as Plexiglas or other transparent protective glass or plastic, is placed over screen 24 to prevent damage to display 12. Display 12 is mounted to trunk 20 with fasteners 30. Fasteners 30 may be a nut and bolt combination. Alternatively, display 12 fits snuggly within cut-out 16 and is held in place by protective rim 26.

Mounting display 12 flush with body 14 has a number of advantages. Since display 12 does not substantially protrude from body 14, it is better protected from impact. People are less likely to bump into display 12 when walking pass the vehicle. Any impact from a large object perpendicular to body 14 is more likely to hit protective rim 26 or transparent protective layer 28. An integrated and flush-mounted display is more stylistic and esthetically pleasing to view. People will perceive display 12 as an integral part of and inherently belonging on vehicle 10.

An integrated display 12 can be made theft resistant. Display 12 can be securely locked into place from the exterior such that a would-be thief would have to gain access to the trunk to remove display 12. Display 12 can also have a built-in identifier code such that it will only work when installed on the assigned vehicle 10. If the internal code of display 12 does not match the identifier code of vehicle 10, then the display is disabled and will not function.

Screen 24 of display 12 is a flat panel viewing screen. Screen 24 can be LCD, plasma, active matrix, or other flat panel viewing surface. Screen 24 is a high resolution display. In one embodiment, screen 24 has resolution of 1024×768 pixels in the viewing area. With its high resolution, screen 24 can show text, graphics, continuous video, and any other image which the occupants would like to present for viewing from the exterior of vehicle 10.

Figure 6:
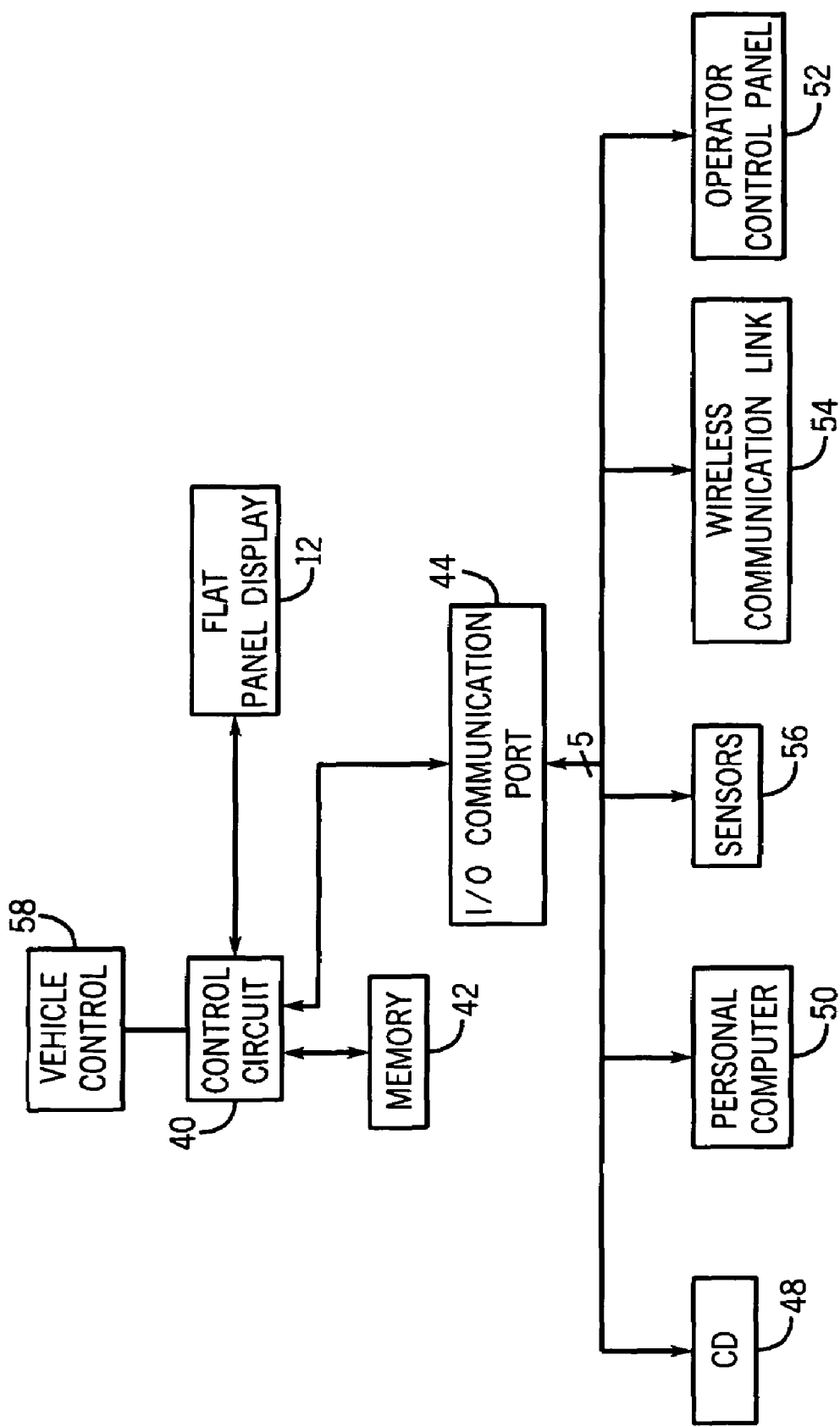
FIG. 6 illustrates a control circuit controlling images on the integrated display.

Turning to FIG. 6, a control circuit 40 is shown for controlling display 12. Control circuit 40 can be implemented with a microprocessor, programmable logic, or discrete logic control circuits. Control circuit 40 uses memory device 42 to store images which are available for display. Memory 42 can be implemented as magnetic storage, electrical erasable programmable memory (EEPROM), or other non-volatile memory. Any graphical image or video clip can be loaded from memory 42 into control circuit 40 for presentation on display 12.

Control circuit 40 is further coupled to input/output (I/O) communication port 44, which allows two-way communication between control circuit 40 and the outside world. I/O communication port 44 receives information from compact disk (CD) player 48 or personal computer (PC) 50. For example, a graphic image or video file can be read from CD 48, or from the hard disk within PC 50, and loaded into control circuit 40. Control circuit 40 can then store the received file in memory 42. Control panel 52 provides a control interface for the occupant of vehicle 10 to set the function of control circuit 40. Control panel 52 includes its own display and plurality of selection or control buttons, and can be mounted on the dashboard, steering column, center console, or other readily accessible area of vehicle 10. The occupant can use control panel 52 to cause a particular file to be loaded from CD 48 or PC 50 into the display control circuit 40 and to change the image which is displayed. The occupant can also search memory 42 to see which image files are available for display.

I/O communication port 44 also interfaces with wireless communication link 54. Wireless communication link 54 transmits signals to and receives signals from a wireless communication system. The wireless communication system transmits signals to vehicle 10 by radio frequency (RF) communication link. The transmitted signals may include traffic updates, weather information, travel advisories, public service bulletins, emergency alerts, and the like. Again, the transmitted signals are loaded through wireless communication link 54 into control circuit 40 and then presented on display 12. Control circuit 40 may store the transmitted signals as image files in memory 42.

In another embodiment, I/O communication port 44 receives sensor signals from internal or external sensors 56. Sensor 56 may be mounted external to vehicle 10 and detects, for example, another vehicle which is following too close. Sensor 56 sends a vehicle-too-close signal to control circuit 40, which automatically loads the appropriate image from memory 42 and displays the message "YOU ARE FOLLOWING TOO CLOSE" with corresponding noticeable graphics on display 12. The message may flash in red or present other effects to get the attention of the driver of the vehicle that is following too close.

An internal sensor 56 can monitor conditions within vehicle 10. Sensor 56 may detect engine failure of vehicle 10, in which case, it sends an engine-failure sensor signal to control circuit 40. Control circuit 40 loads the appropriate image from memory 42 and displays the message "CAUTION-ENGINE POWER LOST; SLOWING DOWN", with accentuating graphics on display 12.

The occupant can set-up or program control circuit 40 via control panel 52 to automatically run a sequence of images on display 12, in any order, for selectable periods of time. The image and video files in memory 42 can be set for a programmed sequence of display or play. For example, the occupant can program image A to run for 1 minute, image B to run for 5 minutes, and so on. Control circuit 40 takes over and executes the programmed sequence. The occupant can enable and disable the wireless transmitted signals and sensor messages.

In the modern information-based society, very little real-time information has been displayed on one of our more prolific means of human action, i.e., motor vehicles. Integrated display 12 makes use of vehicles as a moving means of communication. Display 12 can present advertisements on the rear, front, top, and sides of taxis and public transportation. The advertisement are an important source of revenue for the operators. The advertisements can be rolling or changing at selectable or programmable intervals, e.g., every minute or so. The operators of the taxis and city busses can increase their advertisement revenue by contracting with multiple advertisers, each receiving their time slot on display 12.

The occupants of personal motor vehicles can use display 12 to display virtual bumper stickers and support for their favorite cause or organization. Public service can transmit emergency service information and alerts, which are in turn displayed on the exterior of vehicles having display 12. Vehicles which do not have access to wireless communication system can get real-time information from the display 12 on another vehicle 10 which does receive the wireless communications. Police can broadcast information related to criminal suspects, fugitives, or missing persons, i.e., the message "HAVE YOU SEEN THIS PERSON" with an image of the missing person. Public service information, such as Amber Alerts wherein information related to missing children is broadcast to the public, can be displayed on display 12. If the occupant of vehicle 10 gets stranded along the side of the road, he or she can program the message "I NEED HELP" into display 12. The images on display 12 can be fixed graphical images, which may change at programmable intervals, or continuously playing video images.

The wireless communication link can be used to connect PC 50 with the internet while vehicle is in motion. The occupant can download new images from any website, display the image on display 12, and store the image in memory 42. The wireless communication link can also get information from satellites.

Integrated display 12 provides real-time information for viewing external to vehicle 10. The displayed images can be readily changed either with or without interaction with the occupants of vehicle 10. Display 12 is programmable, stylistic, and visually attractive with respect to vehicle 10.

In another embodiment, display 12 can send information back to control circuit 40. For example, display 12 may include a touch screen, wherein the driver enters an entry code by touching screen 24. The entry code is sent to control circuit 40 which sends a control signal to vehicle control 58. Vehicle control 58 can perform any function or operation such as causing the door to be unlocked.

While one or more embodiments of the present invention have been illustrated in detail, the skilled artisan will appreciate that modifications and adaptations to those embodiments may be made without departing from the scope of the present invention as set forth in the following claims.

What is claimed is:

1. A display integrated with and mounted to an exterior portion of a first motor vehicle, comprising:
    a flat panel display mounted flush to an exterior portion of a vehicle body and within a cutout portion of the exterior portion of the vehicle body, the flat panel display having at least 1024 by 768 pixels to display graphics and including an LCD, plasma, or active matrix display;
    a protective rim surrounding a perimeter of the flat panel display and extending outward from the flat panel display, the protective rim including a rubber or polymer material;
    a protective layer disposed on a viewing surface of the flat panel display, the protective layer including Plexiglass;
    a control circuit coupled for controlling the flat panel display, the control circuit including,
        (a) programmable logic with an identifier code matched to the first motor vehicle for theft deterrence, the programmable logic being configured to disable the flat panel display if the identifier code does not match to the first motor vehicle,
        (b) a memory coupled to the programmable logic for storing graphical images, and
        (c) a two-way communication port coupled to the programmable logic for sending and receiving signals, the two-way communication port being configured to receive information from a compact disc (CD) player and a personal computer (PC);
    a wireless communication link coupled to the two-way communication port for sending and receiving the signals, the wireless communication link being configured to receive signals generated by a public service notification system, the signals including public service bulletins and emergency alerts;
    a first sensor mounted to the first motor vehicle for detecting proximity of a second motor vehicle with respect to the first motor vehicle, the first sensor sending a first warning signal to the control circuit and causing an image corresponding to the first warning signal to be retrieved from the memory and displayed on the flat panel display when a distance between the first and second motor vehicles is less than a predetermined threshold, the image on the flat panel display being accentuated to warn the second motor vehicle, the accentuation including animation of the image;
    a second sensor mounted to the first motor vehicle for sensing a power failure of an engine of the first motor vehicle, the second sensor sending a second warning signal to the control circuit and causing an image corresponding to the second warning signal to be retrieved from the memory and displayed on the flat panel display to notify the second motor vehicle of the power failure of the engine of the first motor vehicle, the image on the flat panel display being accentuated to warn the second motor vehicle, the accentuation including animation of the image; and
    an operator control panel mounted to the dashboard, steering column, or center console of the first motor vehicle and coupled to the control circuit for controlling operation of the flat panel display and including a user interface for causing the control circuit to retrieve image or video data from a CD player or a PC connected to the two-way communication port, specifying the display duration of an image stored in the memory, searching within a plurality of images stored in the memory, and enabling and disabling the wireless communication link and first and second sensors.

* * * * *